United States Patent
Kobayashi et al.

(10) Patent No.: US 7,011,603 B2
(45) Date of Patent: Mar. 14, 2006

(54) FLUID PRESSURE CONTROL DEVICE FOR LOCK-UP MECHANISM

(75) Inventors: Yasuhiko Kobayashi, Anjo (JP); Takeshi Inuzuka, Anjo (JP); Shigeki Takami, Anjo (JP); Yoshitaka Murase, Anjo (JP); Yoichi Tajima, Anjo (JP); Takayuki Kubo, Anjo (JP); Takahiro Kido, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 12 days.

(21) Appl. No.: 10/737,913

(22) Filed: Dec. 18, 2003

(65) Prior Publication Data

US 2004/0144608 A1    Jul. 29, 2004

(30) Foreign Application Priority Data

Dec. 27, 2002    (JP)    ............................. 2002-382546

(51) Int. Cl.
    *F16H 61/14*    (2006.01)
(52) U.S. Cl. ............................. 477/62; 192/3.3; 701/67
(58) Field of Classification Search ............... 192/3.29, 192/3.3, 3.31, 3.33, 85 R, 103 F; 701/51, 701/67; 477/168, 62
    See application file for complete search history.

(56) References Cited

U.S. PATENT DOCUMENTS

| 5,802,490 | A | * | 9/1998 | Droste ........................ 192/3.3 |
|---|---|---|---|---|
| 5,888,166 | A | * | 3/1999 | Minowa et al. ............. 477/168 |
| 6,056,094 | A | * | 5/2000 | Sakai ........................ 192/3.3 |
| 6,085,136 | A | * | 7/2000 | Katakura et al. ............... 192/3.3 |
| 6,390,947 | B1 | * | 5/2002 | Aoki et al. ..................... 477/3 |
| 6,508,740 | B1 | * | 1/2003 | Kimura et al. ............... 192/3.3 |
| 6,647,326 | B1 | * | 11/2003 | Nakamori et al. ............ 701/51 |
| 2002/0107103 | A1 | * | 8/2002 | Nakamori et al. .......... 475/116 |
| 2003/0153428 | A1 | * | 8/2003 | Kitano et al. ................... 477/5 |
| 2003/0171187 | A1 | * | 9/2003 | Aoki et al. ................. 477/107 |

\* cited by examiner

*Primary Examiner*—Rodney H. Bonck
(74) *Attorney, Agent, or Firm*—Oliff & Berridge, PLC (57) ABSTRACT

A fluid pressure control device including a torque converter that is placed between a output shaft of an engine and an input shaft of a transmission, a mechanical oil pump that is driven by the output shaft, a clutch that directly engages the output shaft and the input shaft by employing an engagement pressure based on a fluid pressure that is generated by the mechanical oil pump, an electric oil pump that can supply a fluid pressure to the clutch, and a control unit for controlling the electric oil pump, wherein when the engagement pressure based on the fluid pressure that is generated by the mechanical oil pump is an amount below a necessary engagement pressure that is necessary to engage the clutch, the control unit drives the electric oil pump so as to supply a fluid pressure by at least the amount to the clutch.

17 Claims, 7 Drawing Sheets

FLUID PRESSURE CONTROL DEVICE FOR LOCK-UP MECHANISM

INCORPORATION BY REFERENCE

The disclosure of Japanese Patent Application No. 2002-382546 filed on Dec. 27, 2002 including the specification, drawings and abstract are incorporated herein by reference in its entirety.

BACKGROUND OF THE INVENTION

1. Field of Invention

The invention relates to a fluid pressure control device for a lock-up mechanism so as to perform a lock-up control of a torque converter that is mounted on a vehicle such as an automobile.

2. Description of Related Art

There exists torque converters that are mounted on a vehicle that include a lock-up clutch. When the lock-up clutch operates, a revolution of an output shaft of an engine that was transmitted to an input shaft of a transmission via fluid in the torque converter is directly transmitted to the input shaft of the transmission via the lock-up clutch. Therefore, fuel efficiency is improved.

The lock-up clutch is operated normally by an engagement pressure based on a line pressure that is generated by a mechanical oil pump. The maximum fluid pressure (supply limit fluid pressure) that is generated by the mechanical oil pump is determined by the rpm of the engine. That is, the supply limit fluid pressure is high when the rpm is high while the supply limit fluid pressure is low when the rpm is low.

SUMMARY OF THE INVENTION

In the lock-up clutch described as above, a sufficient engagement pressure cannot be achieved in order to maintain an engaged state when an rpm of the engine decreases. In this case, the engagement of the lock-up clutch is released, and a fuel consumption amount increases by an equivalent amount.

The invention thus provides a fluid pressure control device for a lock-up mechanism that uses an electric oil pump so as to supplement an insufficient engagement pressure of the lock-up clutch that is insufficient due to inadequate fluid pressure from a mechanical oil pump.

The invention, according to a first exemplary aspect, includes a torque converter that is placed between a output shaft of an engine and an input shaft of a transmission, a mechanical oil pump that is driven by the output shaft, a clutch that directly engages the output shaft and the input shaft by employing an engagement pressure based on a fluid pressure that is generated by the mechanical oil pump, an electric oil pump that can supply a fluid pressure to the clutch, and a control unit for controlling the electric oil pump, wherein when the engagement pressure based on the fluid pressure that is generated by the mechanical oil pump is an amount below a necessary engagement pressure that is necessary to engage the clutch, the control unit drives the electric oil pump so as to supply a fluid pressure by at least the amount to the clutch.

BRIEF DESCRIPTION OF THE DRAWINGS

Various embodiments of the invention will be described with reference to the drawings, wherein.

DETAILED DESCRIPTION OF PREFERRED EMBODIMENTS

Figure 1:
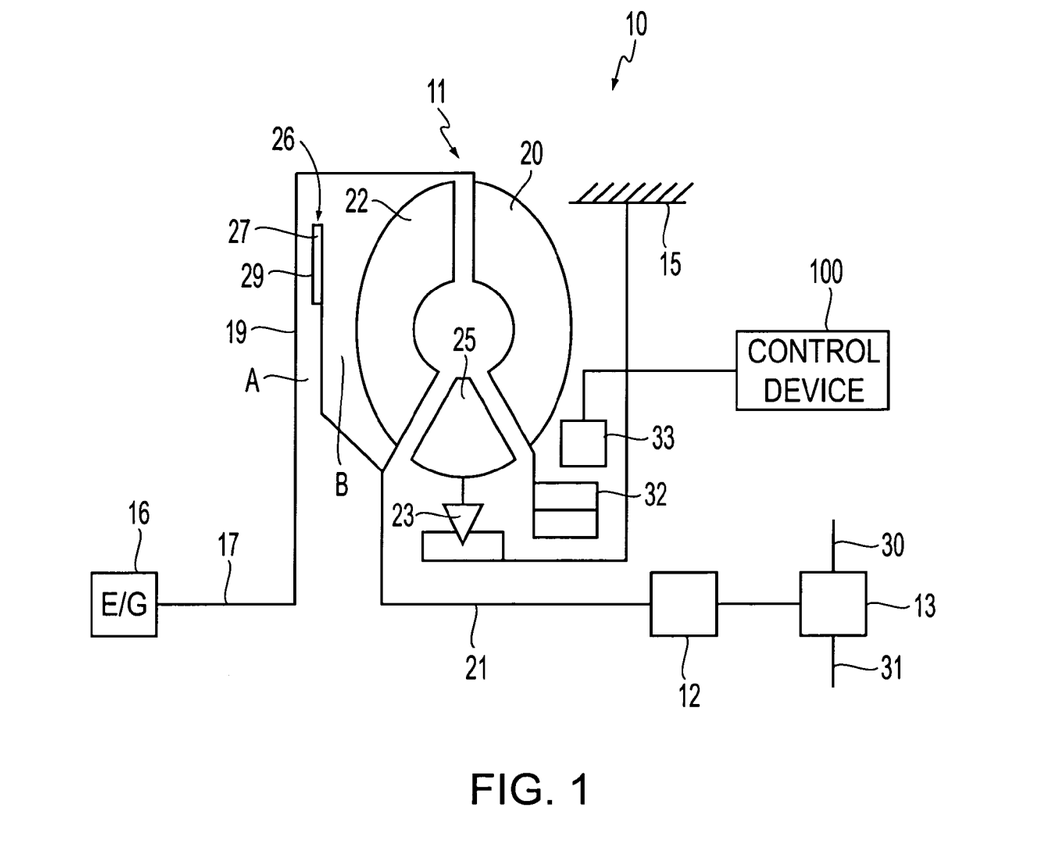
FIG. 1 is a schematic diagram showing a structure of an automatic transmission to which a fluid pressure control device for a lock-up mechanism according to the invention can be applied.

FIG. 1 schematically shows an example of an automatic transmission (A/T) 10 to which a fluid pressure control device for a lock-up mechanism according to the invention can be applied. The automatic transmission 10 shown in FIG. 1 is provided with a torque converter 11, an automatic transmission device 12 and a differential device 13 that are stored in a case 15 (However, a part of the case 15 is shown in FIG. 1).

The torque converter 11 includes a pump impeller 20 that is connected to an output shaft 17 on the engine (E/G) 16 via a front cover 19, a turbine runner 22 that is connected to an input shaft 21 on the automatic transmission device 12 (on the wheel side), and a stator 25 that is supported by the case 15 via a one-way clutch 23.

A lock-up clutch 26 is located in the torque converter 11. The lock-up clutch 26 is connected to the input shaft 21 on the automatic transmission device 12 in the same manner as the turbine runner 22 is connected to the input shaft 21. The lock-up clutch 26, for example, has a substantially disc-like clutch plate 27, and is movably located along the input shaft 21 through a spline connection of a boss portion (not shown) that is secured inside of the clutch plate to the input shaft 21. In addition, a clutch facing 29 is installed in a front face on the outer peripheral side of the clutch plate 27 (a face opposite to an inner face of the front cover 19). The lock-up clutch 26 causes the clutch facing 29 to contact and be separated from the front cover 19 using a differential pressure ΔP (to be described later) between a front side A of the clutch plate 27 and a back face side B (the right side of FIG. 1).

When the lock-up clutch 26 is operated, that is, when the clutch facing 29 is pressed against the front cover 19, the revolution of the engine 16 is directly transmitted to the input shaft 21 via the output shaft 17, the front cover 19, and the clutch plate 27. This is referred to as a direct connection state. On the other hand, when the lock-up clutch 26 is released, that is, when the clutch facing 29 is separated from the front cover 19, the revolution of the engine 16 is transmitted to the input shaft 21 via the output shaft 17, the front cover 19, and fluid (oil) in the torque converter 11. The operation of the lock-up clutch 26 will be detailed later.

The revolution that is transmitted to the input shaft 21 is shifted by the automatic transmission device 12 depending on a driving state, or reversely revolved and transmitted to the differential device 13, and then transmitted to right and left axles 30, 31, and driving wheels (i.e. wheels: not shown). In addition, common four to six speed automatic transmissions or a belt-type continuously variable transmission (CVT) or the like may be selected for the automatic transmission device 12 in the invention.

The aforementioned automatic transmission 10 is provided with a mechanical oil pump 32 and an electric oil pump 33. The mechanical oil pump 32 is connected to the pump impeller 20 as shown in FIG. 1. Therefore, the revolution of the engine 16 is directly transmitted to the mechanical oil pump 32 via the output shaft 17, the front cover 19, and the pump impeller 20. That is, the mechanical oil pump 32 is capable of outputting a high fluid pressure (a large discharge amount) when the rpm of the engine 16 is high; while it is only capable of outputting a low fluid pressure (a small discharge amount) when the rpm is low. On the other hand, the electric oil pump 33 is driven by a motor (not shown) and is controlled by a control device 100 (a control unit) independent of the mechanical oil pump 32. In addition, various types of information about the vehicle such as a vehicle speed, a throttle angle, a gear speed, an oil temperature or the like is input from time to time to the control device 100 for controlling the electric oil pump 33.

Figure 2:
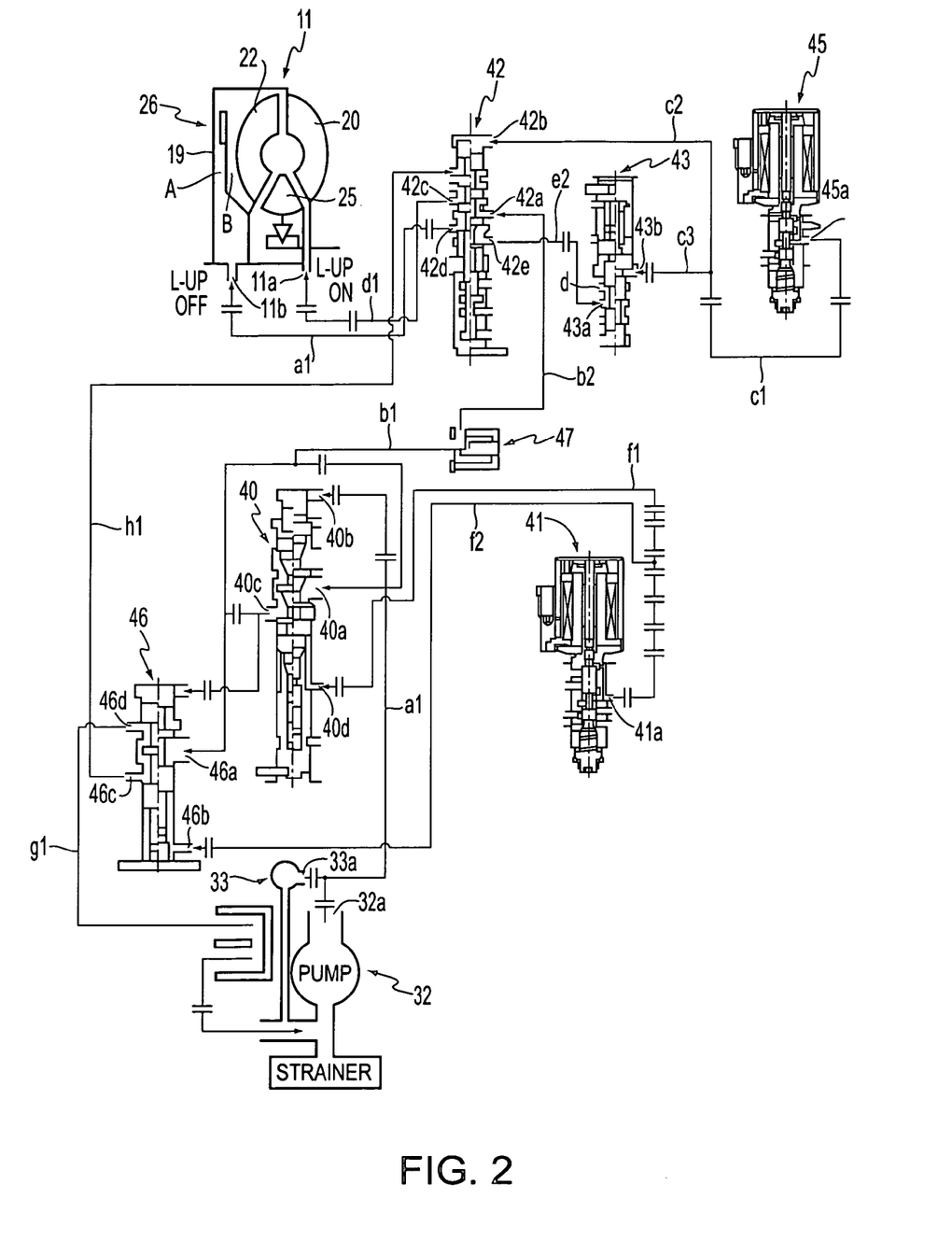
FIG. 2 shows a fluid pressure circuit for controlling an operation of the lock-up clutch.

FIG. 2 shows a fluid pressure circuit for controlling the operation of the lock-up clutch 26. The reference numerals of FIG. 2 that are the same as those of FIG. 1 show the same members or the like. Of the fluid pressure circuit for a five forward speed automatic transmission 10, FIG. 2 shows a valve or the like which directly influences a control of the lock-up clutch 26, and appropriately omits other valves.

As stated above, in FIG. 2, the reference numeral 11 denotes the torque converter, 26 denotes the lock-up clutch, 32 denotes the mechanical oil pump, and 33 denotes the electric oil pump.

In addition, the reference numeral 40 denotes a primary regulator valve (pressure regulating unit) that regulates a line pressure $P_L$ that is generated by the mechanical oil pump 32 or a line pressure $P_L$ that is generated by the mechanical oil pump 32 and the electric oil pump 33. Reference numeral 41 denotes a liner solenoid valve for controlling a line pressure, 42 denotes a lock-up relay valve for switching ON/OFF of the lock-up clutch 26, 43 denotes a lock-up control valve for controlling a fluid pressure of the lock-up clutch 26. Reference numeral 45 denotes a linear solenoid valve for electrically controlling the operation of the lock-up relay valve 42 and the lock-up control valve 43, and 46 denotes a secondary regulator valve for generating a secondary pressure Psec.

In this embodiment, as shown in FIG. 2, the line pressure $P_L$ that is generated by the mechanical oil pump 32 and electric oil pump 33 is controlled as the secondary pressure Psec by the secondary regulator valve 46, and is supplied to the torque converter 11 so as to operate as hydraulic oil for the torque converter 11, as well as an engagement pressure of the lock-up clutch 26. Hereafter, an operation of the embodiment will be described in detail.

First, a case will be explained where the lock-up clutch 26 is controlled by the engagement pressure based on the fluid pressure that is generated by the mechanical oil pump 32. The mechanical oil pump 32 is driven by the revolution of the output shaft 17, which in turn is driven by the revolution of the engine 16, and a fluid pressure is output from a discharge port 32*a*. In this case, the fluid pressure that is output from the discharge port 32*a* is generated depending on the rpm of the output shaft 17, that is, the rpm of the engine 16. A high fluid pressure is generated when the revolution of the engine 16 is high, and a low fluid pressure is generated when the revolution of the engine 16 is low.

The fluid pressure that is output from the discharge port 32*a* is input to an input port 40*a* of the primary regulator valve 40 via a fluid passage a1. In addition, the fluid pressure of the fluid passing through the fluid passage a1 is also input to an input port 40*b* as a control pressure. A control pressure that is output from an output port 41*a* of the linear solenoid valve 41 is input to an input port 40*d* of the primary regulator valve 40 via a fluid passage f1. The primary regulator valve 40 performs a line pressure $P_L$ control for a fluid pressure of the mechanical oil pump 32 by a control pressure that is input to the input port 40*d*, and the fluid pressure is output from an output port 40*c*.

The fluid pressure that is output from the output port 40*c* of the primary regulator valve 40 is input to an input port 46*a* of the secondary regulator valve 46, is output from the output port 41*a* of the linear solenoid valve 41, and regulated by a control pressure that is input to an input port 46*b* of the secondary regulator valve 46 via a fluid passage f2, and extra oil is output from the output ports 46*c*, 46*d*. As a result, the fluid pressure that is discharged from the output port 40*c* of the primary regulator valve 40 is regulated as the secondary pressure Psec, and is input to an input port 42*a* of the lock-up relay valve 42 via a fluid passage b1, a check valve 47 and a fluid passage b2.

Note that the fluid pressure that is discharged from the output port 46*d* of the secondary regulator valve 46 is returned to the mechanical oil pump 32 and the electric oil pump 33 via a fluid passage g1. Moreover, the fluid pressure that is output from the output port 47*c* is supplied to a cooler (not shown) via a fluid passage h1 and the lock-up relay valve 42.

When the lock-up relay valve 42 is positioned in the right half position (ON position), the lock-up clutch 26 is in the locked state. That is, in order to place the lock-up clutch 26 into the locked state, a signal pressure is output from an output port 45*a* by the operation of the linear solenoid valve 45, is input to an input port 42*b* of the lock-up relay valve 42 via fluid passages c1, c2 to press down a spool. As a result, the input port 42*a* and the output port 42*c* of the lock-up relay valve 42 are communicated, the secondary pressure Psec that is input to the input port 42*a* is output from the output port 42*c*, and is then supplied to the torque converter 11 from a lock-up clutch ON port 11*a* via an oil passage d1.

In this case, based on the fact that the lock-up relay valve 42 is positioned in the right half position, the fluid pressure between the front face side A of the lock-up clutch 26 and the front cover 19 is input to an input port 42*d* of the lock-up relay valve 42 via a lock-up OFF port 11*b* and a fluid passage e1, and is then output from an output port 42*e*. Further, the fluid pressure is input to an input port 43*a* of the lock-up control valve 43 via a fluid passage e2 and is discharged from a drain port d. The fluid pressure on the front face side A of the lock-up clutch 26 is discharged, therefore, a differential pressure ΔP (=P2−P1) is generated for the fluid pressure P1 on the front side A and the fluid pressure P2 on the back face side B (P2>P1). The lock-up clutch 26 is engaged with the front cover 19 by this differential pressure ΔP. As a result, the revolution of the engine 16 (refer to FIG. 1) is directly transmitted to the input shaft 21 via the output shaft 17, the front cover 19, and the lock-up clutch 26 and not via fluid (oil) in the torque converter 11.

A slip control is performed to reduce shock when the lock-up clutch 26 is engaged or when the engagement thereof is released. That is, the fluid pressure that is output from the output port 45a of the linear solenoid valve 45 is input to the input port 42b of the lock-up relay valve 42 as a signal pressure via the fluid passages c1, c2 as stated above so that ON/OFF of the lock-up relay valve 42 is switched. In addition, the fluid pressure is input to an input port 43b of the lock-up control valve 43 as a control pressure via a fluid passage c3 in order to adjust an oil amount that is discharged from the drain port d. As a result, the fluid pressure P1 on the front side A of the lock-up clutch 26 is controlled, and then the differential pressure ΔP (=P2−P1) between the front side A and the back face side B enables a slip control.

So far, the case where the lock-up relay valve 42 is in the locked state (the right half position) has been explained. Next, a case where the lock-up relay valve 42 is in an unlocked state (the left half position) will be explained.

The lock-up relay valve 42 is in the locked state when a signal pressure that is output from the output port 45a of the linear solenoid valve 45, and that is then input to the input port 42b of the lock-up relay valve 42 via the fluid passages c1, c2, is smaller than a predetermined value. In this case, the secondary pressure Psec that is output from the output port 40c of the primary regulator valve 40 is input to the input port 42a of the lock-up relay valve 42 via the fluid passage b1, the check valve 47, and the fluid passage b2. The secondary pressure Psec that has been input is output from the input port 42d based on the left half position of the lock-up relay valve 42, and is supplied to the torque converter 11 from the lock-up OFF port 11b via the fluid passage e1. The supplied secondary pressure Psec increases the fluid pressure P1 on the front side A of the lock-up clutch 26. Then, the differential pressure ΔP (P2−P1) between the fluid pressure P1 on the front side A and the fluid pressure P2 on the back face side B of the lock-up clutch 26 is reduced to a necessary engagement pressure (necessary engagement fluid pressure) or less that can maintain the engaged state of the lock-up clutch 26, and the engaged state is released.

In the meantime, even when the lock-up relay valve 42 is in the locked state, if the secondary pressure Psec that is generated by the mechanical oil pump 32, and is supplied to the lock-up clutch 26 via the primary regulator valve 40, the lock-up relay valve 42 or the like is not sufficient to maintain the engaged state of the lock-up clutch 26, that is, if the fluid pressure does not meet the necessary engagement pressure of the lock-up clutch 26, the engaged state of the lock-up clutch 26 is released.

At this point, the lock-up clutch 26 is defined to be in the locked state when the lock-up relay valve 42 is in the locked state. In this definition, namely, the locked state of the lock-up clutch 26 is classified into two cases where the lock-up clutch 26 is in an engaged state and where the engaged state is released. The distinction between the engaged state and the engagement release state is determined based on if the engagement pressure of the lock-up clutch 26 is equal to the necessary engagement pressure or more.

In the invention, in the case where the lock-up relay valve 42 is in the locked state, and the engagement pressure based on the fluid pressure output from the mechanical oil pump 32 does not meet the necessary engagement pressure that is necessary to maintain the engaged state of the lock-up clutch 26, the electric oil pump 33 is driven and fluid pressure that supplements the insufficient engagement pressure or more is supplied to the lock-up clutch.

In this embodiment, as shown in FIG. 2, the electric oil pump 33 is located upstream of the primary regulator valve 40 along the fluid pressure flow. In addition, the fluid pressure that is output from a discharge port 33a of the electric oil pump 33 is input to the input ports 40a, 40b of the primary regulator valve 40 via the fluid passage a1 in the same manner as that of the fluid pressure that is output from the discharge port 32a of the mechanical oil pump 32. That is, the oil that is discharged from the mechanical oil pump 32 and the electric oil pump 33 is joined so as to be supplied to the primary regulator valve 40 as a line pressure $P_L$.

For this reason, a final engagement pressure can be easily controlled by controlling an oil amount that is output from the mechanical oil pump 32 and electric oil pump 33. Moreover, there is no need for another valve for controlling the fluid pressure that is discharged from the electric oil pump 33.

Hereafter, the control of the electric oil pump 33 for ensuring the necessary engagement pressure of the lock-up clutch 26 will be explained. For simplification of the explanation, a case will be explained where the line pressure $P_L$ that is generated by the mechanical oil pump 32 or the line pressure $P_L$ that is generated by the mechanical oil pump 32 and the electric oil pump 33 is regulated as the secondary pressure Psec by the primary regulator valve 40, the secondary regulator valve 46 or the like, is supplied as the engagement pressure of the lock-up clutch 26.

That is, the secondary pressure Psec is supplied to the lock-up clutch 26 as the maximum engagement pressure. Since both the primary regulator valve 40 and the secondary regulator valve 46 are controlled by the control pressure $P_{SLT}$ from the linear solenoid valve 41, the relationship between the secondary pressure Psec and the line pressure $P_L$ is expressed in the formula (3) based on the following (1) and (2).

$$PL = A * P_{SLT} + B \quad (1)$$

$$Psec = C * P_{SLT} + D \quad (2)$$

$$Psec = C/A * (P_L - B) \quad (3)$$

That is, since all of the maximum engagement pressure of the lock-up clutch 26, the secondary pressure Psec and the line pressure $P_L$ are in a direct proportional relationship, a necessary amount of the engagement pressure of the lock-up clutch 26 can be ensured if the line pressure $P_L$ is controlled to a predetermined value.

Therefore, the necessary line pressure can be obtained after the necessary engagement fluid pressure is calculated using the formula (3) because the necessary engagement fluid pressure is equal to the necessary secondary pressure.

A and B in the above formulas (1), (2), and (3) are values showing the characteristic of the primary regulator valve 40. C and D are values showing the characteristic of the secondary regulator valve 46, and PSLT is a valve showing the output fluid pressure of the linear solenoid valve 41.

Figure 3:
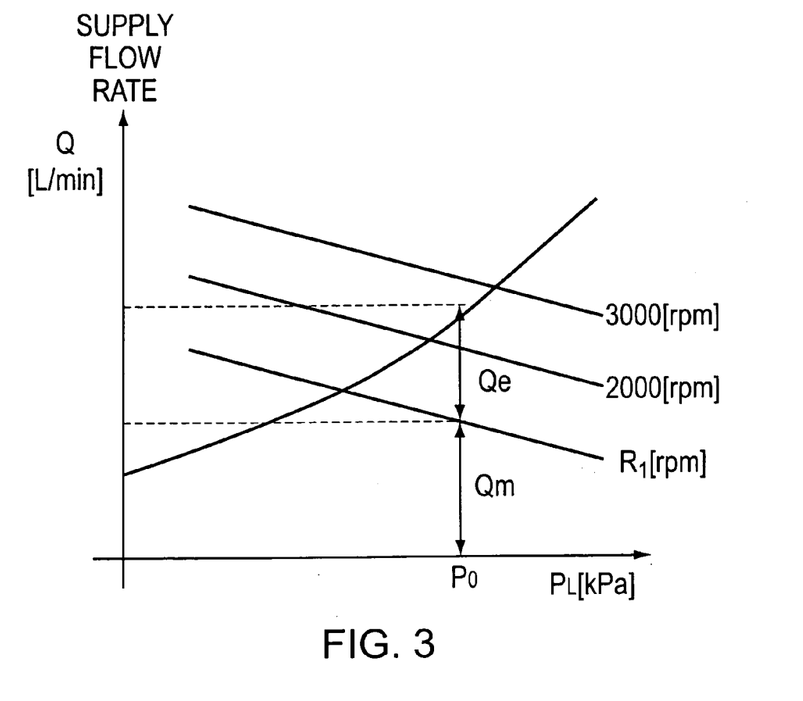
FIG. 3 shows a performance curve of a leakage flow rate characteristic of the automatic transmission and a performance curve of a mechanical oil pump.

FIG. 3 shows a leakage flow rate characteristic of the automatic transmission (A/T) 10 and a performance curve of the mechanical oil pump 32. The horizontal axis indicates a line pressure $P_L$ (kPa) that is generated by the mechanical oil pump 32 and the vertical axis indicates an oil supply flow rate Q (L/min) that is discharged from the mechanical oil pump 32. The leakage flow rate characteristic, that is specific to the automatic transmission, is determined by clearance or the like of each valve of a valve body (not shown) and shows the supply flow rate Q that is necessary to generate a certain line pressure $P_L$. The curve is shown as an upward-sloping curve in the figure.

Moreover, the performance curve of the mechanical oil pump 32 shows a relationship between the supply flow rate and the generated fluid pressure in the performance of the mechanical oil pump 32, that is, the rpm of the engine (3000 rpm, 2000 rpm, and $R_1$ rpm in the figure). The curve is shown as a downward-sloping curve in the figure.

In the figure, when the rpm of the engine is $R_1$, and the necessary engagement pressure of the lock-up clutch 26 is $P_0$, the supply flow rate that is discharged from the mechanical oil pump 32 is Qm. In this case, the amount of the supply flow rate is insufficient by an insufficient amount Qe, which is supplemented by driving the electric oil pump 33.

Figure 4:
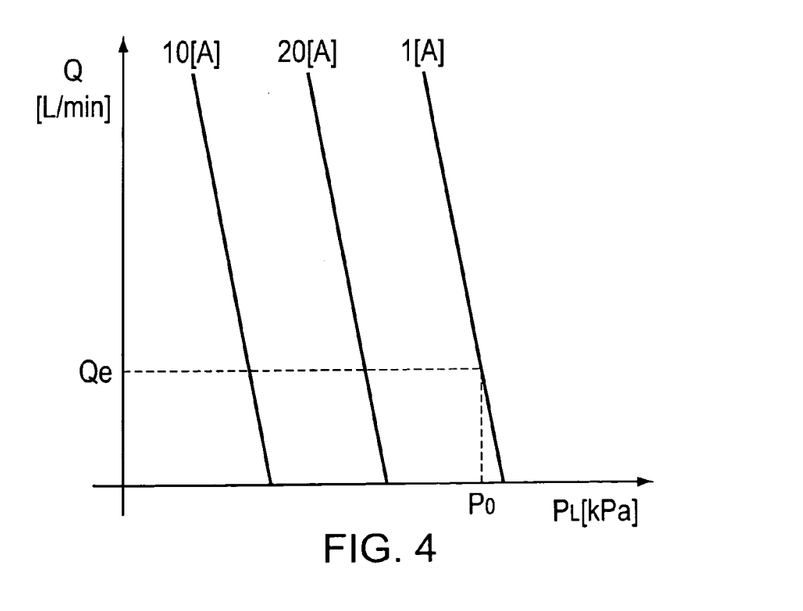
FIG. 4 shows the performance curve of the mechanical oil pump.

Next, FIG. 4 shows a performance curve of the electric oil pump 32. Like FIG. 3, the horizontal axis and the vertical axis indicate the line pressure $P_L$ (kPa) that is generated by the mechanical oil pump 32 and the oil supply flow rate Q (L/min) that is discharged from the mechanical oil pump 32. In the figure, the horizontal axis indicates the necessary engagement pressure $P_0$, the vertical axis indicates the insufficient amount Qe of the supply flow rate, and a current value I (A) that passes through the intersection of $P_0$ and Qe is a current command value. That is, in the aforementioned example, the insufficient amount of the mechanical oil pump 32 is supplemented by applying the current command value I (A) to the electric oil pump 33. Note that the performance curve of the mechanical oil pump shown in FIG. 3 and the performance curve of the electric oil pump shown in FIG. 4 change depending on the oil temperature, respectively. Thus it is desirable to provide an oil temperature detection sensor (not shown) so as to determine the current command value based on the performance curve that is corrected according to the output of the sensor.

Hereafter, control of the electric oil pump 33 for ensuring the necessary engagement pressure $P_0$ of the lock-up clutch 26 will be explained. First, a flow of control will be explained referring to flow charts in FIGS. 5 and 6.

An ON/OFF determination of the lock-up (Lup) by a control device (not shown) (S1 in FIG. 5) is first made. The control device makes an optimal ON/OFF determination of the lock-up mainly based on the vehicle speed, the throttle angle, a gear speed or the like. Next, the lock-up control is performed (S2). In the lock-up control, the linear solenoid valve 45 shown in FIG. 2 performs a slip control of the lock-up clutch 26 so as to reduce shock during the engagement and the engagement release, engage or release of the lock-up clutch. Next, the line pressure control during a normal state is performed (S3). The line pressure $P_L$ that is necessary during the normal state is calculated based on the vehicle speed, the throttle angle, the gear speed or the like to control each valve.

Figure 5:
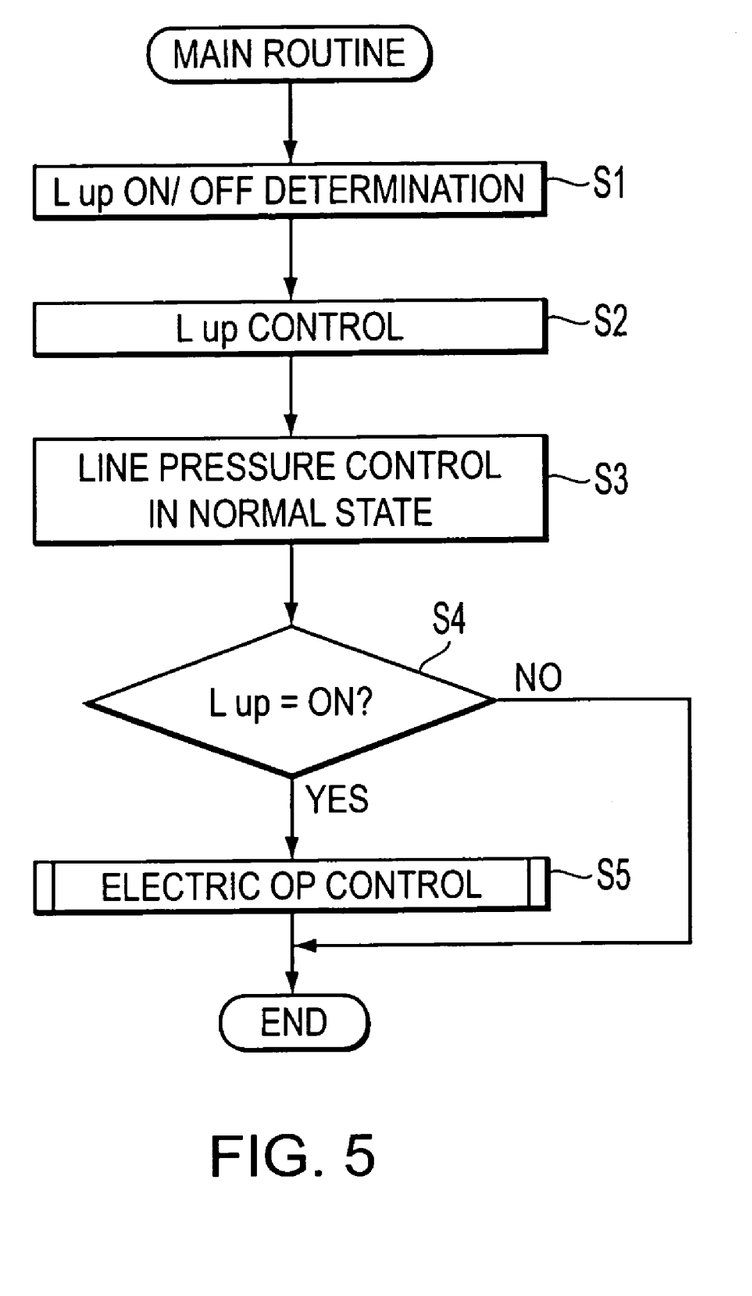
FIG. 5 is a flow chart for controlling the lock-up clutch.

Then, an ON/OFF determination of the lock-up (S4) is made. In the case of OFF ("No" in S4), that is, when the lock-up relay valve is in an unlocked state, the control is complete without driving the electric oil pump 33. On the other hand, in step S4, when the lock-up relay valve 42 is in the locked state ("Yes" in S4), the step proceeds to control the electric oil pump (electric OP) 33 (S5).

Figure 6:
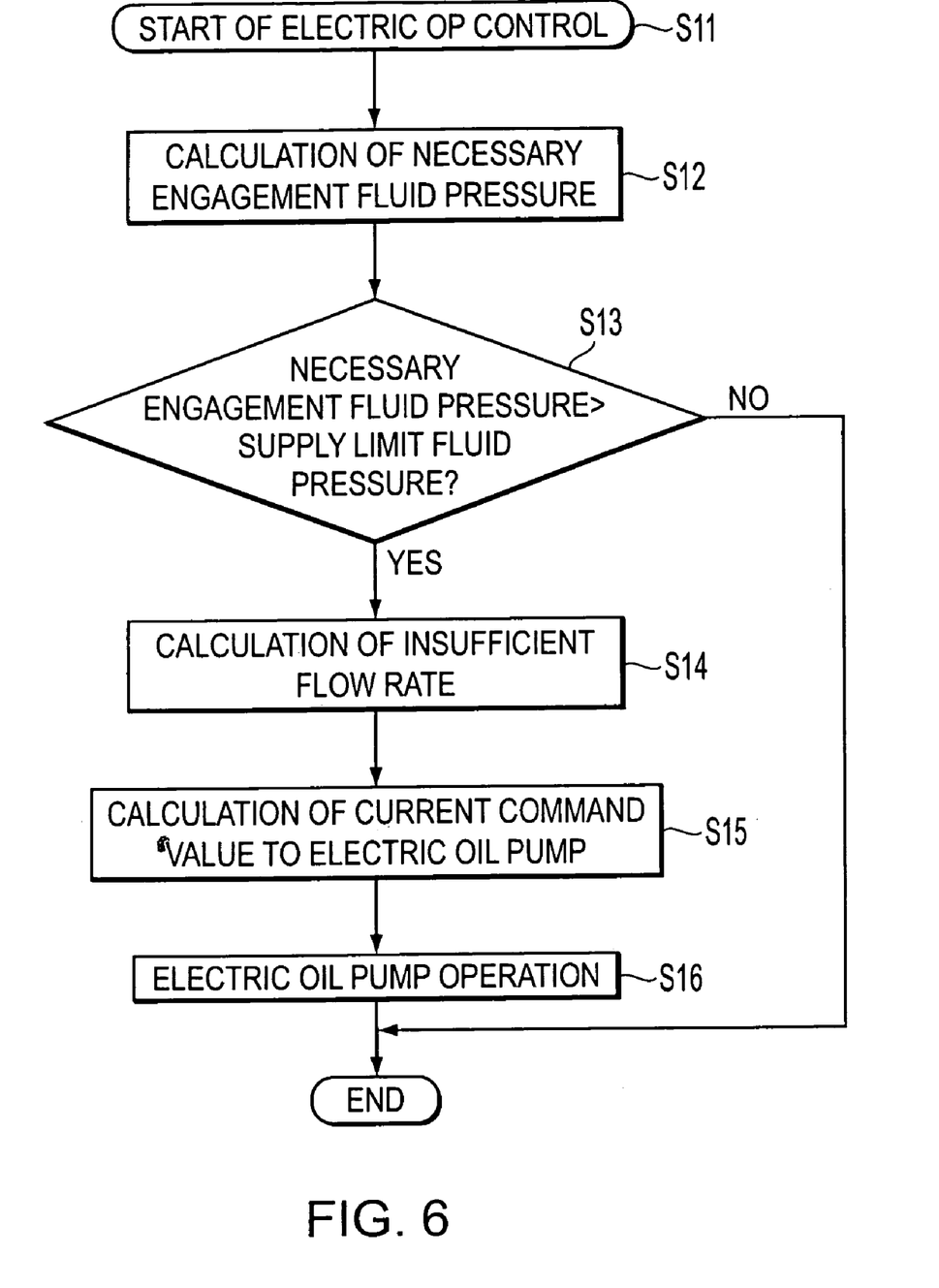
FIG. 6 is a flow chart showing an operation of an electric oil pump for controlling the lock-up clutch.

The control of the electric oil pump 33 is performed according to the flow chart shown in FIG. 6. When the control of the electric oil pump 33 is started (S11), the necessary engagement pressure $P_0$ (lock-up necessary fluid pressure) of the lock-up clutch 26 is calculated (S12). This calculation is performed so as to calculate the necessary engagement pressure $P_0$ after load torque to the lock-up clutch 26 is detected. In the present embodiment, as stated above, the secondary pressure Psec is supplied as the engagement pressure of the lock-up clutch 26, thus the necessary engagement pressure $P_0$ is equal to the necessary line pressure.

As a result of the calculation in step S12, a determination is made as to whether the necessary engagement pressure $P_0$ is larger than the supply limit fluid pressure of the mechanical oil pump (S13). In this case, the necessary engagement pressure $P_0$ and the supply limit fluid pressure of the mechanical oil pump 32 fluctuates depending on the rpm of the engine 16. If the result of the determination in step S13 is No, the control is complete without operating the electric oil pump 33.

On the other hand, if the result is Yes in step S13, the insufficient flow rate is calculated based on the limit performance of the mechanical oil pump 32 and the necessary line pressure of the mechanical oil pump that are obtained from the performance curve of the mechanical oil pump 32 shown in FIG. 3 as mentioned above (S14). The insufficient flow rate corresponds to the insufficient amount Qe of the supply flow rate in the figure.

After the insufficient flow rate is calculated, the current command value is calculated based on the performance of the electric oil pump 33 and the insufficient flow rate using the performance curve of the electric oil pump 33 (S15). The current command value corresponds to 1(A) in FIG. 4.

After the current command value is determined, the electric oil pump 33 is operated (S16) by applying the current command value 1(A). As a result, the insufficient amount of the fluid pressure generated by the mechanical oil pump 32, which is inadequate due to a low rpm of the engine 16, is supplemented by the electric oil pump 33 so as to ensure the necessary line pressure, that is, the necessary engagement pressure $P_0$ of the lock-up clutch 26. That is, in comparison with a conventional fluid pressure control device where there is no electric oil pump 33, and the necessary engagement pressure $P_0$ is generated by the mechanical oil pump 32 only, the engaged state of the lock-up clutch 26 can be maintained for a longer period. Therefore, as the engaged state of the lock-up clutch 26 can be maintained for a longer period, the fuel consumption amount is greatly reduced.

Hereafter, this effect will be specifically explained by taking an example where the vehicle is in a coasting state. For simplification of the explanation as stated above, a case will be explained where the line pressure $P_L$ that is generated by the mechanical oil pump 32 is regulated as the secondary pressure Psec by the primary regulator valve 40, the secondary regulator valve 46 or the like, is supplied to the lock-up clutch 26 as the engagement pressure. That is, the case where the engagement pressure almost equals the secondary pressure Psec will be explained.

Figure 7:
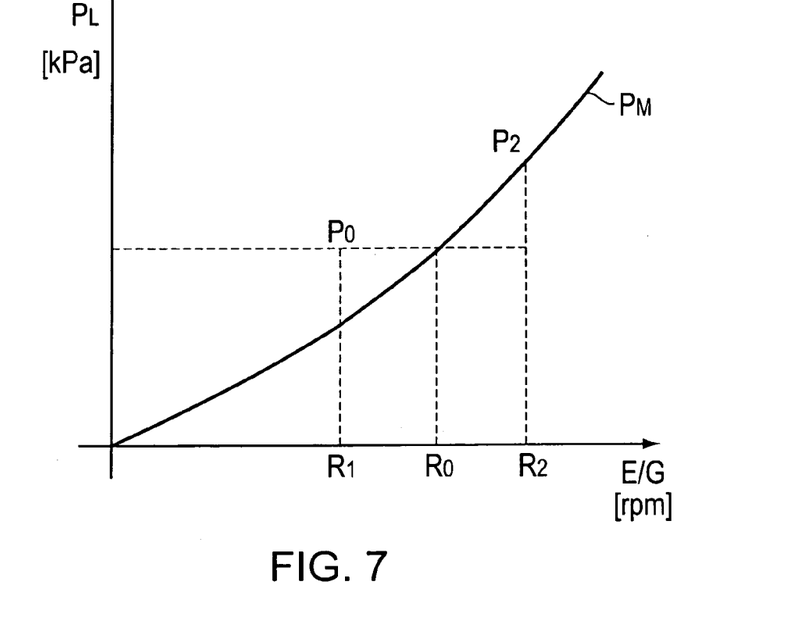
FIG. 7 shows a limit fluid pressure that is generated by the mechanical oil pump.

FIG. 7 shows the limit fluid pressure (which is substantially equal to the maximum line pressure) Pm that is generated by the mechanical oil pump 32. The horizontal axis indicates the R (rpm) of the engine (E/G) 16, and the vertical axis indicates the line pressure $P_L$. The upward-sloping curve in the figure that passes through the origin indicates the limit fluid pressure Pm that is generated by the mechanical oil pump 32. As the rpm of the engine 16 increases, the limit fluid pressure Pm that is generated increases; while as the rpm of the engine 16 decreases, the limit fluid pressure Pm that is generated decreases.

Figure 8:
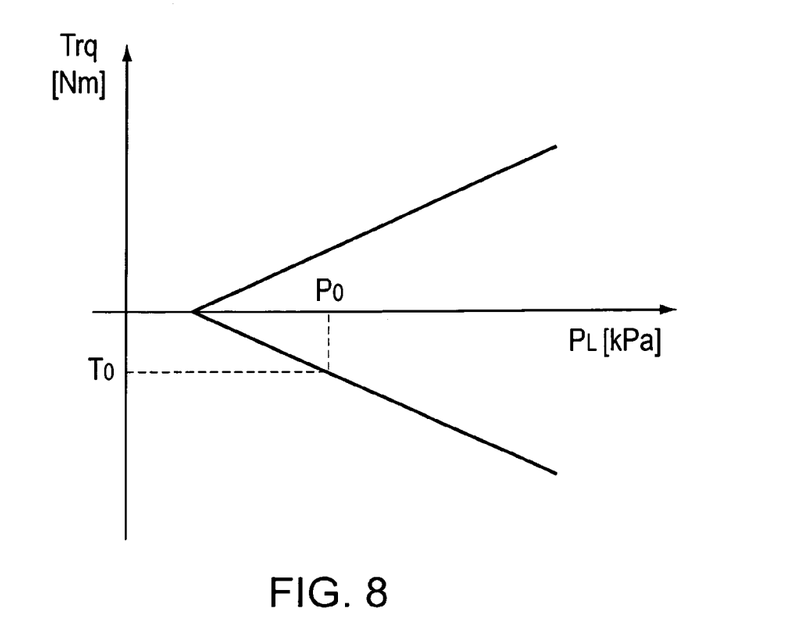
FIG. 8 shows a relationship between an engagement pressure and torque in the lock-up clutch.

FIG. 8 shows the torque that is generated by the engine 16, or the necessary engagement pressure of the lock-up clutch 26 that is necessary to receive drag torque when the engine is not driven such as during coasting or the like. The horizontal axis indicates the line pressure $P_L$ (kPa) and the vertical axis indicates the torque Trq (Nm). By substituting the relationship between the engagement pressure of the lock-up clutch 26 and the capacity of the lock-up torque in the formula (3), the necessary line pressure can be obtained from the lock-up input torque, that is shown as a graph in FIG. 8. This graph may be stored as a map in the control device 100.

Now, assuming that the vehicle is in a coasting state, the necessary engagement pressure $P_0$ of the lock-up clutch 26 for generating predetermined drag torque $T_0$ by the relationship between the engagement pressure and the torque in FIG. 8 is uniquely determined. The engagement pressure of the lock-up clutch 26 is generated by the mechanical oil pump 32, and the limit fluid pressure Pm that is generated by the mechanical oil pump 32 decreases as the rpm of the engine 16 decreases as shown in FIG. 7. As shown in the figure, when the rpm of the engine 16 is equivalent to $R_0$ or more (for example, $R_2$), the limit fluid pressure Pm that is generated by the mechanical oil pump 32 is equivalent to the necessary engagement pressure $P_0$ or more, thus the engaged state of the lock-up clutch 26 can be maintained. On the other hand, when the rpm of the engine 16 does not reach $R_0$ (for example, $R_1$), the necessary engagement pressure P exceeds the generated limit fluid pressure Pm, and the engaged state of the lock-up clutch 26 cannot be maintained. Actually, in the coasting state, the rpm of the engine 16 gradually decreases, therefore, it is highly presumable that the engaged state of the lock-up clutch 26 cannot be maintained.

Therefore, in this embodiment, as stated above, the electric oil pump 33 is operated so as to supplement the engagement pressure, thus the lock-up state of the lock-up clutch 26 can be maintained for a longer period. As a result, the fuel cut (fuel stop) range is increased, enabling reduction in the fuel consumption amount.

Figure 9A:
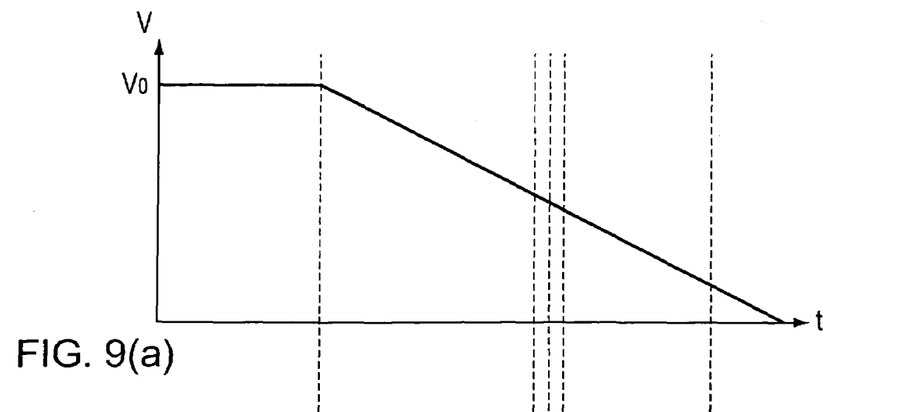
FIGS. 9A–9B are time charts showing a vehicle speed, an rpm of an engine, and an engagement pressure of the lock-up clutch while the vehicle is coasting.
Figure 9B:
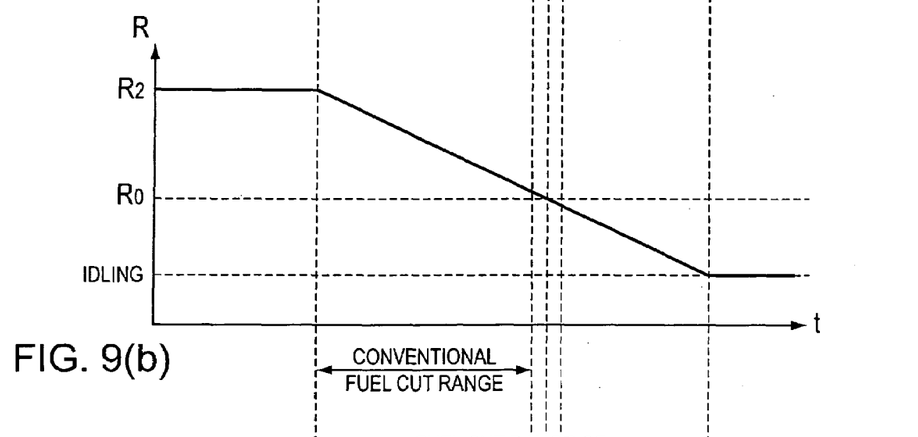
Figure 9C:
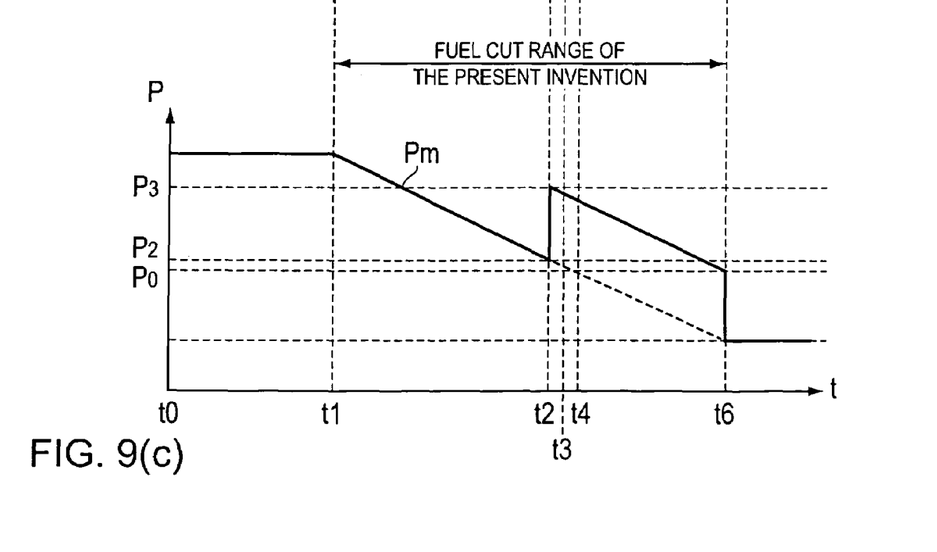

Hereafter, the reduction in the fuel consumption amount will be specifically explained referring to FIG. 9. FIG. 9A, FIG. 9B, and FIG. 9C are time charts showing the vehicle speed V (km), the rpm of the engine (rpm) and the engagement pressure P (kPa) of the lock-up clutch 26 while the vehicle is coasting, respectively. In all time charts, horizontal axes indicate time t.

Time $t_0$ to $t_1$ along the time axis indicates a period where the vehicle is driven at a constant speed. In this period, the vehicle speed $V_0$, and the rpm $R_2$ (corresponding to $R_2$ in FIG. 7 as stated above) of the engine 16 are constant. In this case, the lock-up relay valve 42 as shown in FIG. 2 is in the locked state, the limit fluid pressure Pm that is generated by the mechanical oil pump 32 is constant, and exceeds the necessary engagement pressure $P_0$ of the lock-up clutch 26. Therefore, the engaged state of the lock-up clutch 26 is maintained.

In the time $t_1$, when the accelerator pedal is turned off, the vehicle is in a coasting state, and the supply of the fuel to the engine 16 is stopped. That is, the fuel cut is started. In this coasting state, the vehicle speed V, the rpm of the engine R, the limit fluid pressure P that is generated by the mechanical oil pump gradually decreases. Then, in the time $t_3$, when the rpm of the engine R becomes $R_0$, the limit fluid pressure that is generated by the mechanical oil pump 32 reaches the necessary engagement pressure $P_0$ as shown in FIG. 7, thus the engaged state of the lock-up clutch 26 cannot be maintained. For this reason, conventionally, the rpm of the engine rapidly decreases as shown by a dashed line between the time $t_3$ and $t_4$, and the fuel supply is started again so as to maintain the rpm of the engine in the idling state. That is, the fuel cut is complete. In addition, conventionally, the idling state is continued, and the time $t_1$ to $t_3$ (or to $t_4$) is the fuel cut range.

On the other hand, in the present embodiment, as stated above, the electric oil pump 33 is driven by a predetermined current command value (I (A) shown in FIG. 4) at a predetermined timing (time $t_2$ to be described later) so as to extend the fuel cut range during coasting.

After the vehicle enters a coasting state on and after $t_1$, before the engaged state of the lock-up clutch 26 becomes unable to be maintained because the rpm of the engine is reduced to $R_0$, that is, when the limit fluid pressure Pm that is generated by the mechanical oil pump 32 reaches the first threshold value $P_2$ that is slightly larger than the necessary engagement pressure $P_0$, the engagement pressure of the lock-up clutch 26 is increased to $P_3$ by driving the electric oil pump 33. The timing for driving the electric oil pump 33 is the time $t_2$. From the $t_2$ to $t_5$, the maximum engagement pressure Pm of the mechanical oil pump 32 and the engagement pressure ($P_3-P_2$) that is generated by the electric oil pump 33 are supplied to the lock-up clutch 26. If the engagement pressure that comes from both the mechanical oil pump 32 and the electric oil pump 33 exceeds the necessary engagement pressure $P_0$ until the rpm of the engine reaches the idling state, the engaged state of the lock-up clutch 26 can be maintained. Therefore, the rpm of the engine can be gradually reduced as shown by a solid line between the time $t_1$ to $t_5$ in FIG. 9. During this period, since the engaged state of the lock-up clutch 26 is maintained, the fuel supply to the engine 16 can be stopped. That is, in the present embodiment, the fuel cut range can extend from time $t_1$ to $t_5$ by appropriately employing the electric oil pump 33, thus extending the fuel cut range in comparison with the conventional fuel cut range of time $t_1$ to $t_3$. As a result, the fuel consumption amount can be reduced by the increase amount in the fuel cut range.

In addition, in FIG. 9, if the value of the engagement pressure ($P_3-P_2$) that is generated by the electric oil pump 33 is appropriately set, it is possible to set both the engagement pressure of both mechanical oil pump 32 and electric oil pump 33 to be lower than the necessary engagement pressure $P_0$ before the time $t_5$ when the engine 16 is in an idling state. Alternatively, it is possible to set the engagement pressure of both mechanical oil pump 32 and electric oil pump 33 to exceed the necessary engagement pressure $P_0$ after the time $t_5$. In the latter case, even when the engine 16 is in an idling state, the engaged state of the lock-up clutch 26 is maintained, thus knocking might occur.

Therefore, in the latter case, in order to prevent such a problem, the second threshold value is set around the idling revolution of the engine 16. Then, when the rpm of the engine 16 is reduced to the second threshold value, it is desirable to release the engaged state of the lock-up clutch 26 by turning off the lock-up relay valve 42 by the linear solenoid valve 45 as shown in FIG. 2.

According to the first exemplary aspect of the invention, even if the engaged state of the lock-up clutch cannot be maintained by only the mechanical oil pump, the engaged state of the lock-up clutch can be maintained by driving the electric oil pump when necessary. As a result, a reduction in the fuel consumption amount is possible. The reduction in the fuel consumption amount results from extending a fuel cut range mainly during the period while the vehicle is coasting.

According to the second exemplary aspect of the invention, the electric oil pump is driven only when the lock-up clutch is in the locked state and an engagement pressure of the lock-up clutch does not reach a necessary engagement pressure level by only using the mechanical oil pump.

According to the third exemplary aspect of the invention, both the mechanical oil pump and electric oil pump are located upstream of a pressure regulating unit. Therefore, a fluid pressure that is output from the mechanical oil pump and the electric oil pump is jointly regulated by the pressure regulating unit. As a result, a special member such as a pressure regulating valve for regulating the fluid pressure that is output from the mechanical oil pump is not necessary. Thus, the configuration is simplified, and a control of the engagement pressure is easy.

According to the fourth exemplary aspect of the invention, when the engagement pressure of the lock-up clutch is reduced to a first threshold value that is higher than the necessary engagement pressure, the electric oil pump is driven. Therefore, a driving timing can be precisely set. In addition, a timing is delayed at which the engagement pressure that is supplied to the lock-up clutch is reduced to the necessary engagement pressure. As a result, the fuel consumption amount can be reduced by extending the fuel cut range while the vehicle is coating by an equivalent amount.

According to the fifth exemplary aspect of the invention, the engagement of the lock-up clutch is released when the rpm of the engine is reduced to a second threshold value close to the rpm of idling revolution. Therefore, a knocking can be prevented that results from the engagement of the lock-up clutch during idling revolution of the engine.

According to the sixth exemplary aspect of the invention, the engagement pressure of the lock-up clutch is controlled by a current command value with respect to the electric oil pump. As a result, responsivity is high and control with high precision.

What is claimed is:

1. A fluid pressure control device, comprising:
a torque converter that is placed between an output shaft of an engine and an input shaft of a transmission;
a mechanical oil pump that is driven by the output shaft;
a clutch that directly engages the output shaft and the input shaft by employing an engagement pressure based on a fluid pressure that is generated by the mechanical oil pump;
an electric oil pump that can supply the fluid pressure to the clutch; and
a control unit for controlling the electric oil pump, wherein when the engagement pressure based on the fluid pressure that is generated by the mechanical oil pump during a coasting state of a vehicle is a first threshold value that is higher than a necessary engagement pressure that is necessary to engage the clutch, the electric oil pump is driven in order to maintain at least the necessary engagement pressure until the engine reaches an idling state.

2. The fluid pressure control device according to claim 1, comprising:
a switching unit that switches between a locked state where the clutch is able to be in an engaged state and an unlocked state where the clutch is not in the engaged state, wherein the fluid pressure is supplied to the clutch by driving the electric oil pump during the locked state.

3. The fluid pressure control device according to claim 2, comprising:
a pressure regulating unit that is located downstream of the mechanical oil pump and upstream of the clutch, wherein the electric oil pump is located upstream of the pressure regulating unit.

4. The fluid pressure control device according to claim 3, wherein a second threshold value close to the idling state is provided, and the engagement of the clutch is released by the switching unit when a number of revolutions of the engine is reduced to the second threshold value.

5. The fluid pressure control device according to claim 4, wherein the control unit:
calculates the first threshold value;
calculates an insufficient amount of fluid flow when the calculated first threshold value exceeds a supply limit fluid pressure of the mechanical oil pump;
calculates a current command value with respect to the electric oil pump based on the calculated results; and
operates the electric oil pump based on the current command value.

6. The fluid pressure control device according to claim 3, wherein the control unit:
calculates the first threshold value;
calculates an insufficient amount of fluid flow when the calculated first threshold value exceeds a supply limit fluid pressure of the mechanical oil pump;
calculates a current command value with respect to the electric oil pump based on the calculated results; and
operates the electric oil pump based on the current command value.

7. The fluid pressure control device according to claim 2, wherein a second threshold value close to the idling state is provided, and the engagement of the clutch is released by the switching unit when the number of revolutions of the engine is reduced to the second threshold value.

8. The fluid pressure control device according to claim 7, wherein the control unit:
calculates the first threshold value;
calculates an insufficient amount of fluid flow when the calculated first threshold value exceeds a supply limit fluid pressure of the mechanical oil pump;
calculates a current command value with respect to the electric oil pump based on the calculated results; and
operates the electric oil pump based on the current command value.

9. The fluid pressure control device according to claim 2, wherein the control unit:
calculates the first threshold value;
calculates an insufficient amount of fluid flow when the calculated first threshold value exceeds a supply limit fluid pressure of the mechanical oil pump;
calculates a current command value with respect to the electric oil pump based on the calculated results; and
operates the electric oil pump based on the current command value.

10. The fluid pressure control device according to claim 1, wherein the control unit:
calculates the first threshold value;
calculates an insufficient amount of fluid flow when the calculated first threshold value exceeds a supply limit fluid pressure of the mechanical oil pump;
calculates a current command value with respect to the electric oil pump based on the calculated results; and
operates the electric oil pump based on the current command value.

11. A method of operating a torque converter that is placed between an output shaft of an engine and an input shaft of a transmission, a mechanical oil pump that is driven by the output shaft, a clutch that directly engages the output shaft and the input shaft by employing an engagement pressure based on a fluid pressure that is generated by the mechanical oil pump, and an electric oil pump that can supply the fluid pressure to the clutch, comprising:

controlling the electric oil pump, wherein when the engagement pressure based on the fluid pressure that is generated by the mechanical oil pump during a coasting state of a vehicle is a first threshold value that is higher than a necessary engagement pressure that is necessary to engage the clutch, the electric oil pump is driven in order to maintain at least the necessary engagement pressure until the engine reaches an idling state.

12. The method of claim 11, comprising:
switching between a locked state where the clutch is able to be in an engaged state and an unlocked state where the clutch is not in the engaged state, wherein the fluid pressure is supplied to the clutch by driving the electric oil pump during the locked state.

13. The method of claim 11, comprising:
placing a pressure regulating unit downstream of the mechanical oil pump and upstream of the clutch, wherein the electric oil pump is located upstream of the pressure regulating unit.

14. The method of claim 11, wherein a second threshold value close to the idling state is provided, and the engagement of the clutch is released when a number of revolutions of the engine is reduced to the second threshold value.

15. The method of claim 11, comprising:
calculating the first threshold value;
calculating an insufficient amount of fluid flow when the calculated first threshold value exceeds a supply limit fluid pressure of the mechanical oil pump;
calculating a current command value with respect to the electric oil pump based on the calculated results; and
operating the electric oil pump based on the current command value.

16. A fluid pressure control device, comprising:
a torque converter that is placed between an output shaft of an engine and an input shaft of a transmission;
a mechanical oil pump that is driven by the output shaft;
an electric oil pump;
a clutch that engages the output shaft and the input shaft by employing an engagement pressure based on a fluid pressure that is generated by only the mechanical oil pump or that is generated by both the mechanical oil pump and the electric oil pump; and
a control unit for controlling the electric oil pump, wherein when the mechanical oil pump cannot obtain a first threshold value that is higher than a predetermined engagement pressure based on the fluid pressure in order to engage the clutch during a coasting of a vehicle, the control unit drives the electric oil pump to maintain at least the engagement pressure based on the fluid pressure generated by both the mechanical oil pump and the electric oil pump until the engine reaches an idling state.

17. A method of operating a torque converter that is placed between an output shaft of an engine and an input shaft of a transmission, a mechanical oil pump that is driven by the output shaft, an electric oil pump and a clutch that engages the output shaft and the input shaft by employing an engagement pressure based on a fluid pressure that is generated by only the mechanical oil pump or that is generated by both the mechanical oil pump and the electric oil pump, comprising:

controlling the electric oil pump, wherein when the mechanical oil pump cannot obtain a first threshold value that is higher than a predetermined engagement pressure based on the fluid pressure in order to engage the clutch during a coasting of a vehicle, the electric oil pump is driven to maintain at least the engagement pressure based on the fluid pressure generated by both the mechanical oil pump and the electric oil pump until the engine reaches an idling state.

* * * * *